Patented June 2, 1936

2,042,757

UNITED STATES PATENT OFFICE 2,042,757

PROCESS OF PREPARING ACID WOOL DYE- STUFFS OF THE ANTHRAQUINONE SERIES AND THE DYESTUFFS THUS OBTAINABLE

Karl Zahn and Heinrich Koch, Frankfort-on- the-Main, and Klaus Weinand, Leverkusen- I. G. Werk, Germany, assignors to General Aniline Works, Inc., New York, N. Y., a corpo- ration of Delaware No Drawing. Application March 1, 1934, Serial No. 713,612. In Germany March 1, 1933

18 Claims. (Cl. 260—60)

The present invention relates to a process of preparing acid wool dyestuffs of the anthraqui- none series and to the dyestuffs thus obtainable.

We have found that new acid dyestuffs of the anthraquinone series of very good fastness prop- erties are obtained by the process which com- prises reacting an unsulfonated anthraquinone which contains in an alpha-position a substituent which is exchangeable for an imino radical and in another alpha-position a substituent of the same kind or another substituent and which may be further substituted in other positions, with an aromatic mono-amino-compound containing at least two directly linked nuclei one of which is hydrogenated and sulfonating the compound thus obtained. By substituting, for instance, for the two chlorine atoms of 1,4-dichloroanthraquinone or for the two hydroxyl groups of 1,4-dihydroxy- anthraquinone the radicals of 2-amino-5,6,7,8- tetrahydronaphthalene and subsequently sulfon- ating the condensation product, a dyestuff is ob- tained dyeing wool from an acid bath bluish- green tints which have very good fastness prop- erties and are much faster to fulling than are the dyeings obtainable with the known com- mercial dyestuff made from para-toluidine (cf. Schultz "Farbstofftabellen" No. 1201). A like result is arrived at by using, for instance, 1-am- ino-5,6,7,8-tetrahydronaphthalene or 1-amino- 4-cyclohexylbenzene. With the aid of 2-amino- 1,2,3,4-tetrahydronaphthalene a very valuable blue dyestuff is obtained.

Furthermore, by substituting, for instance, for each of the two chlorine atoms of 1,5-dichloro- anthraquinone the radicals of 2-amino-5,6,7,8- tetrahydronaphthalene or of 1-amino-4-cyclo- hexylbenzene and subsequently sulfonating the condensation products, dyestuffs are obtained which dye wool from an acid bath violet tints which are remarkable for their very good fast- ness properties. In comparison with the dyeings obtained with the corresponding commercial dye- stuff made from para-toluidine (cf. Schultz "Farbstofftabellen" No. 1208) the dyeings thus obtained have a much better fastness to washing and to fulling.

By causing 1-amino-2,4-dibromoanthraquinone to react with 2-amino-1,2,3,4-tetrahydronaph- thalene and subsequently sulfonating the con- densation product, a dyestuff is obtained which dyes wool from an acid bath reddish blue tints. These dyeings likewise show, in comparison with those obtained with the aid of the corresponding commercial dyestuff made from para-toluidine (cf. Schultz "Farbstofftabellen" No. 1199), a con- siderably better fastness to fulling.

The dyestuffs obtainable by the process of our present invention may be characterized by the following general formula:

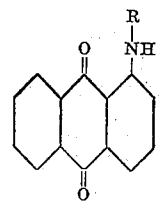

wherein —NH—R represents the radical of an aromatic mono-amino-compound containing at least two directly linked nuclei one of which is hydrogenated, and wherein there is contained in alpha-position of the anthraquinone nucleus a further —NH.R radical of the same meaning or a substituent of the group consisting of —NH$_2$, —NH-alkyl and —NH-aryl and wherein there may be contained further substituents of the group consisting of halogen and alkyl and where- in the R radicals may contain a sulfo group.

The dyestuffs obtainable by the process of our present invention are new technically valuable compounds.

The following examples illustrate the invention. The parts are by weight.

(1) 10 parts of leuco-quinizarin, 20 parts of quinizarin and 15 parts of boric acid are heated with 200 parts of 1-amino-5,6,7,8-tetrahydro- naphthalene at a temperature between 120° C. and 130° C., while stirring, until the melt has assumed a clear greenish-blue coloration. Air is then introduced and the melt is diluted at 70° C. with 150 parts of alcohol. The condensation product which separates in a crystalline state is filtered by suction, dried and then recrystallized from isoamyl alcohol. Needles are obtained which have a bronze luster and melt at 211° C. to 212° C. The dyestuff is soluble in concentrated sulfuric acid to a reddish-blue solution. The dyestuff is sulfonated at room temperature with concentrated sulfuric acid containing about 5 per cent of sulfuric anhydride. The sulfonic acid dyes wool from an acid bath green tints. The dyeings are distinguished by a very good fastness to washing and fulling.

(2) By using in Example (1) 2-amino-5,6,7,8-tetrahydronaphthalene instead of 1-amino-5,6,7,8-tetrahydronaphthalene and otherwise proceeding as indicated in the preceding example, a dyestuff is obtained which crystallizes from amyl alcohol in the form of fine felted needles and melts at 208° C. to 209° C. It has the following formula:

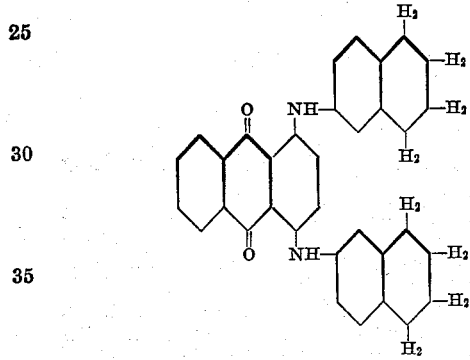

It is soluble in concentrated sulfuric acid to a blue solution. After the sulfonation the dyestuff dyes wool from an acid bath green tints. The dyeings possess very good fastness properties.

(3) 28 parts of 1,4-dichloroanthraquinone are heated at 200° C. to 220° C. with 25 parts of anhydrous potassium acetate in 180 parts of 2-amino-5,6,7,8-tetrahydronaphthalene, while stirring, until the melt has assumed a clear greenish-blue coloration. The melt is worked up as indicated in Example (1). The dyestuff is identical with that obtained in Example (2).

(4) By substituting in Example (1) for the 1-amino-5,6,7,8-tetrahydronaphthalene 200 parts of 1-amino-4-cyclohexylbenzene and otherwise carrying out the condensation as indicated in that example, a dyestuff is obtained which when recrystallized from benzene melts at 181° C. It has the following formula:

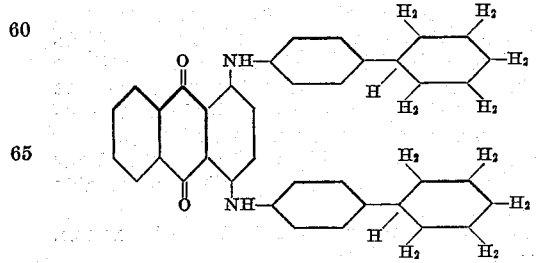

It is soluble in concentrated sulfuric acid to a reddish-blue solution. After sulfonation the dyestuff dyes wool from an acid bath green tints. The dyeings have a very good fastness to fulling and to washing.

(5) By using in Example (3) 1,4-dichloro-5,8-dihydroxyanthraquinone instead of 1,4-dichloroanthraquinone, a dyestuff is obtained which when recrystallized from benzene is soluble in concentrated sulfuric acid to a blue solution. The sulfonation is carried out as described in Example (1). The sulfonic acid dyes wool from an acid bath fast yellowish-green tints.

(6) 10 parts of leucoquinizarin are heated with 80 parts of 2-amino-1,2,3,4-tetrahydronaphthalene at a temperature between 140° C. and 150° C. until the melt has assumed an olive-green coloration. It is then allowed to cool to 100° C. and mixed with 1 part of piperidine, whereupon air is introduced until a clear blue solution is obtained. On dilution with alcohol the condensation product separates in the form of blue crystals of a bronze luster. The dyestuff melts at 255° C. It has the following formula:

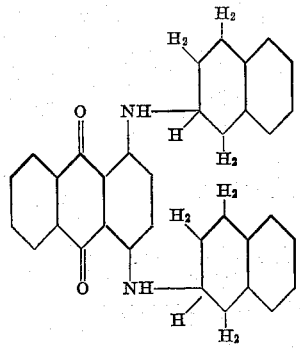

It is soluble in concentrated sulfuric acid to a yellow solution. On sulfonation with sulfuric acid monohydrate a sulfonic acid is obtained which dyes wool from an acid bath clear blue tints. The dyeings are remarkable for their good fastness properties.

6 parts of 1,4-dichloroanthraquinone are heated with 3 parts of potassium acetate in 50 parts of 2-amino-1,2,3,4-tetrahydronaphthalene for three hours at a temperature between 190° C. and 200° C. On dilution with methanol beautiful blue crystals are obtained which are filtered by suction and melt at 255° C. The melting point of a mixture of the product with that made from leucoquinizarin is likewise at 255° C.

(7) 8.4 parts of 1,5-dichloroanthraquinone are heated at 190° C. for 5 hours with 60 parts of 2-amino-5,6,7,8-tetrahydronaphthalene and 4 parts of anhydrous sodium acetate. On dilution with methanol the condensation product separates in the form of bluish-red crystals. It melts at 220° C. and is soluble in concentrated sulfuric acid to a feebly yellow solution. The dyestuff is sulfonated at room temperature with concentrated sulfuric acid containing about 5 per cent of sulfuric anhydride. The sulfonic acid dyes wool from an acid bath violet tints of very good fastness to washing and to fulling.

(8) By using in Example (7) instead of 2-amino-5,6,7,8-tetrahydronaphthalene 60 parts of 1-amino-4-cyclohexylbenzene and otherwise conducting the condensation as described in that example, a dyestuff is obtained in the form of red-brown laminae melting at 304° C. to 305° C. and soluble in concentrated sulfuric acid to a colorless solution. After sulfonation in oleum of about 5% of SO₃ the dyestuff dyes wool from an acid bath violet tints. The dyeings have a very good fastness to washing and fulling.

(9) By causing 8,4 parts of 1,5-dichloranthraquinone to react with 60 parts of 2-amino-1,2,3,4-tetrahydronaphthalene in the presence of 4 parts of potassium acetate at a temperature between 180° C. and 190° C. and diluting the melt after 4 hours with methanol, the dyestuff base is precipitated in the form of bluish-red needles which melt at 265° C. and are soluble in concentrated sulfuric acid to a colorless solution. The dyestuff is sulfonated with sulfuric acid monohydrate, and the sulfonic acid so obtained dyes wool from an acid bath bluish-red tints.

(10) 10 parts of 1-methylamino-4-bromanthraquinone are heated with 60 parts of 2-amino-1,2,3,4-tetrahydronaphthalene and 5 parts of potassium acetate for 5 hours at 190° C. When the melt is diluted with methanol the condensation product separates in the form of brilliant blue crystals melting at 209° C. to 210° C. and being soluble in concentrated sulfuric acid to an almost colorless solution. The dyestuff is sulfonated in sulfuric acid monohydrate, and the sulfonic acid so obtained dyes wool from an acid bath very clear greenish blue shades.

A similar dyestuff is obtained by starting from 1-cyclohexylamino-4-bromanthraquinone.

(11) 10 parts of 1-toluido-4-methoxyanthraquinone are heated with 60 parts of 2-amino-1,2,3,4-tetrahydronaphthalene at a temperature between 170° C. and 180° C. for some hours. On dilution of the melt with methanol fine blue needles separate. The dyestuff melts at 230° C. and is soluble in concentrated sulfuric acid to a blue solution. The dyestuff base is sulfonated in sulfuric acid monohydrate. The sulfonic acid so obtained dyes wool from an acid bath clear bluish-green tints of good fastness properties.

(12) 12 parts of 1-amino-2,4-dibromanthraquinone are heated with 5 parts of potassium acetate in 60 parts of 2-amino-1,2,3,4-tetrahydronaphthalene for several hours at a temperature between 180° C. and 190° C. The melt is diluted with methanol whereby blue needles are precipitated. The dyestuff which melts at 203° C. is sulfonated with the aid of sulfuric acid monohydrate. The sulfonic acid so obtained dyes wool from an acid bath reddish-blue tints of very good fastness to washing, to fulling and to sea water.

(13) By using in Example 12 instead of 12 parts of 1-amino-2,4-dibromanthraquinone 10 parts of 1-amino-2-methyl-4-chloranthraquinone and keeping the melt for 5 hours at a temperature between 170° C. and 180° C. the condensation product is precipitated on addition of methanol in the form of coarse crystals melting at 223° C. to 224° C. The dyestuff is sulfonated in sulfuric acid monohydrate and then dyes wool from an acid bath clear violet tints.

(14) 10 parts of 1,8-dichloranthraquinone are heated with 80 parts of 2-amino-1,2,3,4-tetrahydronaphthalene for 4 hours at a temperature between 190° C. and 200° C. On dilution with methanol the dyestuff base separates in the form of violet needles melting at 220° to 221° C. and being soluble in concentrated sulfuric acid to a feebly yellow solution. The dyestuff base is sulfonated in sulfuric acid monohydrate, and the sulfonic acid so obtained dyes wool violet tints.

We claim:

1. The process which comprises reacting an unsulfonated anthraquinone which contains in an alpha-position a substituent which is exchangeable for an imino radical and in another alpha-position a substituent of the same kind or a substituent of the group consisting of —$NH_2$, —NH-alkyl and —NH-aryl, an aromatic mono-amino-compound containing at least two directly linked nuclei one of which is hydrogenated.

2. The process which comprises reacting an unsulfonated anthraquinone which contains in an alpha-position a substituent which is exchangeable for an imino radical and in another alpha-position a substituent of the same kind or a substituent of the group consisting of —$NH_2$, —NH-alkyl and —NH-aryl, with an aromatic mono-amino compound containing at least two directly linked nuclei one of which is hydrogenated and sulfonating the products thus obtained.

3. The process which comprises reacting an unsulfonated anthraquinone which contains in an alpha-position a substituent which is exchangeable for an imino radical and in another alpha-position a substituent of the same kind or a substituent of the group consisting of —$NH_2$, —NH-alkyl and —NH-aryl, with an aromatic mono-amino-compound containing two directly linked nuclei one of which is hydrogenated.

4. The process which comprises reacting an unsulfonated anthraquinone which contains in an alpha-position a substituent which is exchangeable for an imino radical and in another alpha-position a substituent of the same kind or a substituent of the group consisting of —$NH_2$, —NH-alkyl and —NH-aryl, with an aromatic mono-amino-compound containing two directly linked nuclei one of which is hydrogenated and sulfonating the products thus obtained.

5. The process which comprises reacting an unsulfonated anthraquinone which contains in 1,4-positions two hydroxy groups or two chlorine atoms with an aromatic mono-amino-compound containing two directly linked nuclei one of which is hydrogenated.

6. The process which comprises reacting an unsulfonated anthraquinone which contains in 1,4-positions two hydroxy groups or two chlorine atoms with an aromatic mono-amino-compound containing two directly linked nuclei one of which is hydrogenated and sulfonating the products thus obtained.

7. The process which comprises melting at about 120° C. to about 130° C. quinizarin with 2-amino-5,6,7,8-tetrahydronaphthalene in the presence of leuco quinizarin and boric acid.

8. The process which comprises melting at about 120° C. to about 130° C. quinizarin with 2-amino-5,6,7,8-tetrahydronaphthalene in the presence of leuco quinizarin and boric acid and sulfonating the product thus obtained.

9. The process which comprises melting at about 120° C. to about 130° C. quinizarin with 1-amino-4-cyclohexylbenzene in the presence of leuco quinizarin and boric acid.

10. The process which comprises melting at about 120° C. to about 130° C. quinizarin with 1-amino-4-cyclohexylbenzene in the presence of leuco quinizarin and boric acid and sulfonating the product thus obtained.

11. The process which comprises melting at about 120° C. to about 130° C. quinizarin with 2-amino-1,2,3,4-tetrahydronaphthalene in the presence of leuco quinizarin and boric acid.

12. The process which comprises melting at about 120° C. to about 130° C. quinizarin with 2-amino-1,2,3,4-tetrahydronaphthalene in the presence of leuco quinizarin and boric acid and sulfonating the product thus obtained.

13. The compounds of the following general formula:

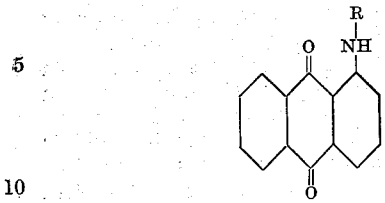

wherein —NH—R represents the radical of an aromatic mono-amino compound containing at least two directly linked nuclei one of which is hydrogenated, and wherein there is contained in alpha-position of the anthraquinone nucleus a further —NH.R radical of the same meaning or a substituent of the group consisting of —NH₂, —NH-alkyl and —NH-aryl and wherein there may be contained further substituents of the group consisting of halogen and alkyl and wherein the R radicals may contain a sulfo group.

14. The compounds of the following general formula:

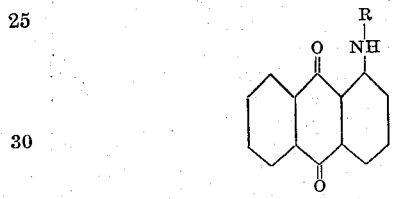

wherein —NH—R represents the radical of an aromatic mono-amino-compound containing two directly linked nuclei one of which is hydrogenated, and wherein there is contained in alpha-position of the anthraquinone nucleus a further —NH.R radical of the same meaning or a substituent of the group consisting of —NH₂, —NH-alkyl and —NH-aryl and wherein there may be contained further substituents of the group consisting of halogen and alkyl and wherein the R radicals may contain a sulfo group.

15. The compounds of the following general formula:

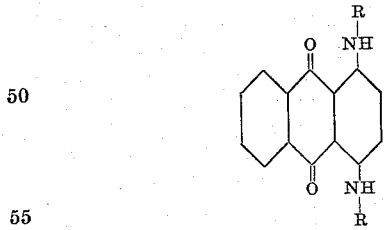

wherein the two —NH.R radicals represent identical radicals of an aromatic mono-amino-compound containing two directly linked nuclei one amine one nucleus of which is hydrogenated, and wherein the R radicals may contain a sulfo group.

16. The compound of the following formula:

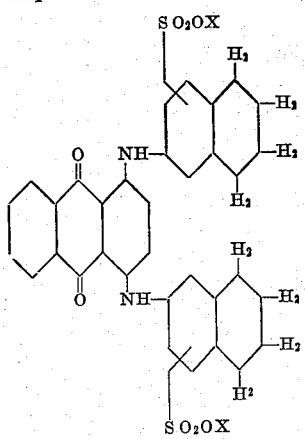

wherein X means hydrogen or an alkali metal atom, dyeing wool from an acid bath green tints of very good fastness properties.

17. The compound of the following formula:

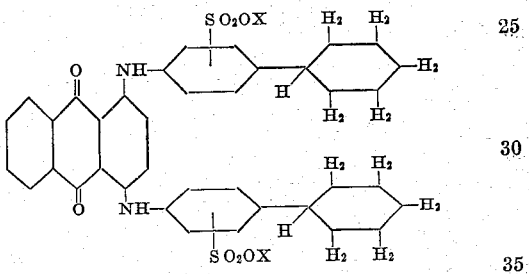

wherein X means hydrogen or an alkali metal atom, dyeing wool from an acid bath green tints of very good fastness to fulling and to washing.

18. The compound of the following formula:

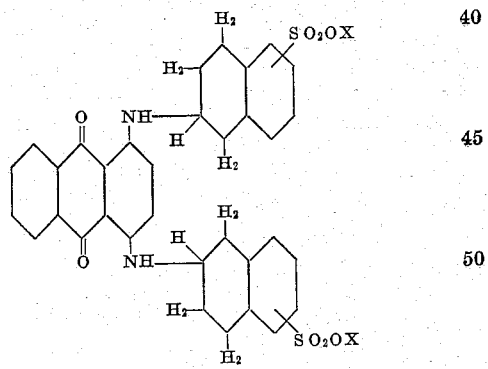

wherein X means hydrogen or an alkali metal atom, dyeing wool from an acid bath clear blue tints of good fastness properties.

KARL ZAHN.
HEINRICH KOCH.
KLAUS WEINAND.